United States Patent
Kasher

[11] Patent Number: 6,056,241
[45] Date of Patent: May 2, 2000

[54] THIN FILM PARACHUTE WITH CONTINUOUS LATERAL REINFORCING FIBERS

[75] Inventor: Anthony D. Kasher, Inver Grove Heights, Minn.

[73] Assignee: Ballistic Recovery Systems, Inc., South St. Paul, Minn.

[21] Appl. No.: 09/134,195

[22] Filed: Aug. 14, 1998

Related U.S. Application Data

[60] Provisional application No. 60/055,758, Aug. 14, 1997.

[51] Int. Cl.[7] .............................. B64D 1/02; B64D 17/00; B64D 17/02
[52] U.S. Cl. ....................... 244/145; 244/138 R; 244/142
[58] Field of Search ................................ 244/138 R, 142, 244/145

[56] References Cited

U.S. PATENT DOCUMENTS

| | | | |
|---|---|---|---|
| 4,117,993 | 10/1978 | Palm et al. ............................... | 244/145 |
| 4,343,448 | 8/1982 | Johnson .................................... | 244/145 |
| 4,638,961 | 1/1987 | Rousseau ................................. | 244/142 |
| 4,834,323 | 5/1989 | Reuter ..................................... | 244/145 |
| 4,993,667 | 2/1991 | Uotila ..................................... | 244/142 |
| 5,260,122 | 11/1993 | Prevorsek et al. ....................... | 244/145 |
| 5,330,133 | 7/1994 | Rasmussen ............................. | 244/145 |

*Primary Examiner*—Peter M. Poon
*Assistant Examiner*—Charles R. Ducker, Jr.
*Attorney, Agent, or Firm*—James W. Miller

[57] ABSTRACT

A thin film polymeric membrane is made from a plurality of adjacent sections that are bonded together along longitudinal seams taken with reference to an axis of symmetry. The membrane is reinforced laterally by a continuous helical reinforcing fiber pattern that passes the reinforcing fiber(s) a plurality of times over each of the longitudinal seams. The membrane desirably is in the shape of a parachute or balloon envelope.

20 Claims, 5 Drawing Sheets

THIN FILM PARACHUTE WITH CONTINUOUS LATERAL REINFORCING FIBERS

CROSS REFERENCE TO RELATED APPLICATIONS

This application claims the benefit of one or more previously filed copending provisional applications identified as follows: application Ser. No. 60/055,758 filed Aug. 14, 1997.

TECHNICAL FIELD

This invention relates to a thin film parachute that is reinforced laterally to act like a seamless parachute.

BACKGROUND OF THE INVENTION

Parachutes are the lightest, most cost-effective device for decelerating a vehicle in the atmosphere. They are also very reliable when manufactured according to strict quality control procedures, maintained properly and used within their design operating envelope. The very dynamic nature of parachuting activities has created the necessary high standards of engineering associated with them.

Present day parachutes have many applications, including sport parachuting, airdrop of troops and supplies, emergency aircrew escape, stabilization of ordnance, and recovery of many other aerospace vehicles. Their configurations range from round, non-steerable, hemispherical shaped parachutes that simply create drag and slow descent to wing shaped gliding parachutes that offer precision control and maneuverability. Round parachutes are used for many applications because their purpose is simple, to slow a payload to a descent speed that is conducive to a safe touchdown. It is this simplicity that enhances their reliability.

Parachutes have traditionally been fabricated from woven textiles in the form of fabrics, tapes, webbing, and thread. The technology of round parachutes has changed very little since the advent of modern aviation at the turn of the century. The major innovations over this time have been in the raw fiber materials and the weaving, braiding and coating processes used to fabricate the woven textiles.

Silk and cotton, organic materials that are extremely susceptible to degradation, were commonly used in parachutes before World War II. Most silk parachutes were limited to life cycles of less than seven years and required numerous periodic inspections. Nylon, introduced by DuPont in 1939, was probably the most significant contribution to modern parachute technology. Another significant material enhancement was the introduction of Kevlar in 1979. Nylon and Kevlar are the primary materials used in the fabrication of modern parachute textiles.

The basic structure of a round parachute consists of the canopy and suspension lines. The canopy, which creates the aerodynamic drag necessary to decelerate the payload, can have a variety of shapes. Examples of round canopy shapes include flat circular, hemispherical, semi-hemispherical, conical, and multi-conical. These are only a few of the more common options for canopy shape. The designer can choose any shape that will meet the aerodynamic requirements of the specific application.

Round parachutes commonly have a vent at the apex of the canopy to allow a small amount of airflow to escape which provides stability during the parachute's descent. The suspension lines are attached to the skirt, i.e. the lower perimeter, of the canopy. The opposite end of the suspension lines are connected to the payload, either directly or via a riser or series of risers.

The most common method of fabricating a canopy is by sewing together a series of trapezoidal shaped fabric panels, called gores, to form its desired shape. The strength of this basic canopy structure is dependent on the strength of the fabric and of the sewn seams. Thea canopy can be structurally enhanced by sewing a series of reinforcement tapes to its top surface at critical locations. Radial bands are sewn to the vertical seams of the canopy gores from the skirt to the vent. Lateral bands are sewn horizontally to the canopy around its entire circumference at the skirt band, at the vent band, and possibly at one or more intermediate locations between the skirt and the vent.

The suspension lines are attached to the radial bands at the canopy skirt and converge to a riser or set of risers at the opposite end. The riser connects the parachute to its payload. Vent lines are attached to the radial bands and routed across the vent opening to an adjacent radial band on the opposite side of the vent.

One of the primary considerations in parachute design is strength-to-weight ratio. The structure has to be strong enough to sustain the aerodynamic forces associated with decelerating its payload, yet be lightweight and unobtrusive so as to maximize the utility of the aircraft associated with their operation.

One such attempt at increasing the strength-to-weight ratio of a round parachute has been through the use of reinforced thin films. The properties of thin polymer films can be enhanced by laminating fibers to them to create a reinforced thin film. These "composite" structures combine the physical properties of the individual materials to optimize their overall properties. The thin film is a flexible, low-permeability membrane that provides the aerodynamic characteristics necessary for these devices. The fiber reinforcements provide structural integrity and act as a barrier to tear propagation.

Reinforced thin films have been used with a moderate degree of success in the manufacturing of sails and balloons. Rolls of extruded thin films, in thicknesses ranging from a quarter mil to several mils, are laminated with a pattern of fibers, either individual fibers or fibers provided in a prewoven scrim form. Sections of this material are then cut into shapes that can be assembled into the required sail or balloon shape in the same way that three dimensional parachute canopy shapes are made from smaller gores. However, instead of sewing, the sections are bonded together with an adhesive.

Since the fibers provide the primary structural support in these reinforced thin film membranes, an effective bonded seam must transfer loads from the fibers in one section to those in an adjacent section. To attain maximum seam effectiveness, the fibers, which are typically spaced from ⅛ inch to one inch apart, would have to be aligned in a one-to-one pattern along the entire length of the seam. Otherwise, the seam strength is primarily a function of the thin film strength, which is considerably less than that of the fiber reinforcements. However, it is very difficult and thus quite time consuming and expensive to obtain the necessary fiber alignment to provide sufficient strength along the seams.

Bonded seams have therefore been the primary weak link in the development of high performance reinforced thin film structures. This problem is especially detrimental to parachute structures which can be subjected to the very high structural loads that are encountered when decelerating a vehicle or other payload from high speeds. Although modern adhesives are very effective, problems are encountered in designing a seam that can effectively transfer structural loads across the fibers in adjacent gores.

One sail manufacturer has created a method for eliminating these structural discontinuities associated with bonded seams. Raw thin film is cut into the geometric sections required to form the desired overall sail shape and laid onto a large mold. Then, using a computer controlled six degree-of-freedom gantry that scans the mold surface, the reinforcement fibers are then bonded to the thin film in a continuous pattern across the entire sail. This fiber pattern is designed to accommodate the stress requirements for each specific sail shape. However, this method of manufacture would be cost prohibitive for parachute applications because of the facility requirements for accommodating such a large mold and the equipment necessary to lay out complex fiber patterns.

In summary, a method for cost effectively producing a reinforced thin film parachute that eliminates the need for bonded structural seams would provide significant improvements over current parachute technology.

SUMMARY OF THE INVENTION

One aspect of this invention is to provide a reinforced thin film structure that can be applied to the manufacturing of flexible structural membranes with an axis of symmetry, such as round parachutes and balloon envelopes. The primary advantage of this invention is the improvement in the structure's strength-to-weight ratio. The invention takes advantage of the axis of symmetry by using a continuous helical pattern of fibers from the apex of the structure to its skirt, thereby eliminating the need to bond the ends of structural fibers at the seam of two adjacent sections.

Another aspect of this invention allows for a moldless, rotational application of the fibers to the thin film which provides significant manufacturing efficiencies.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
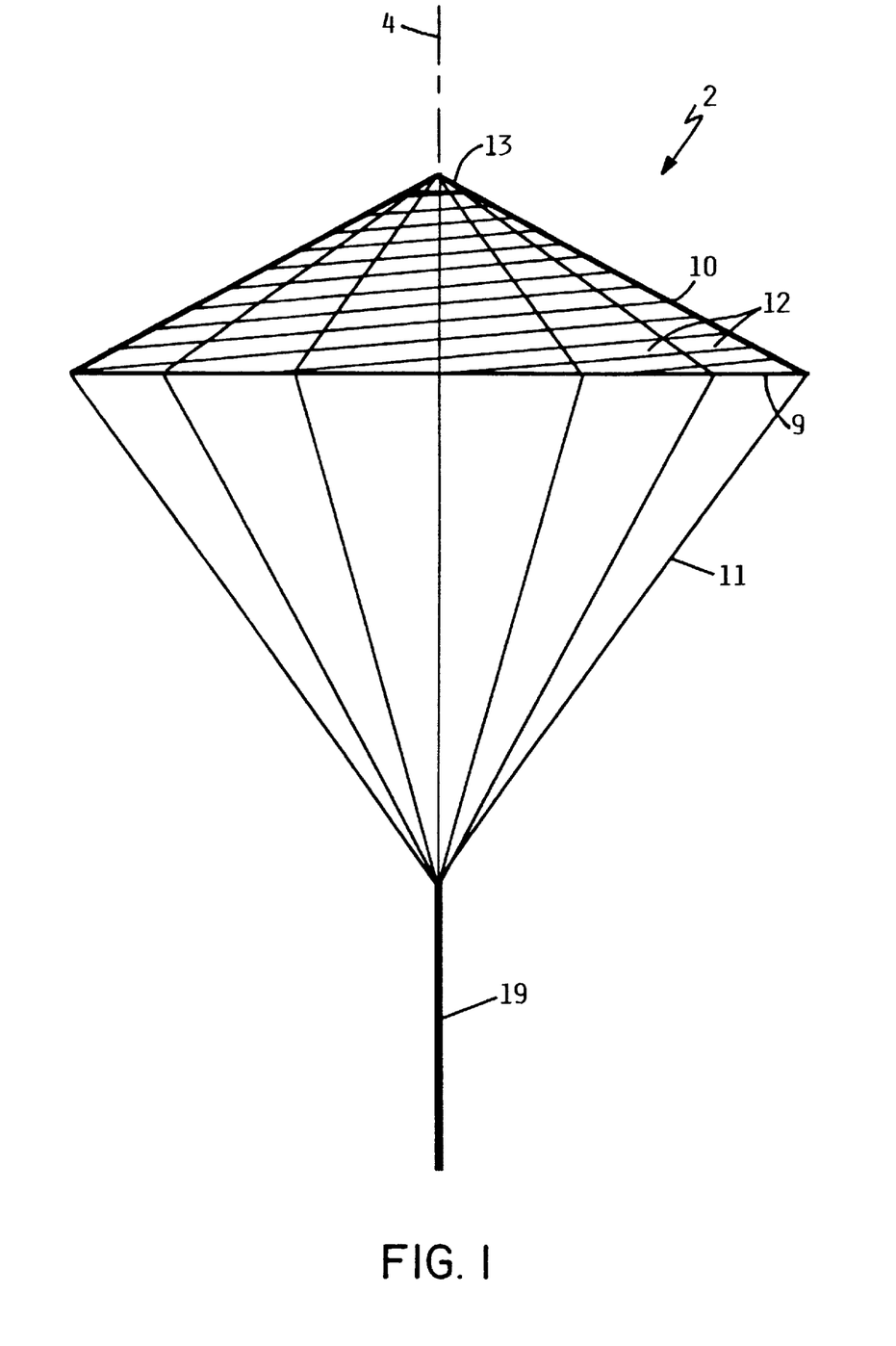
FIG. 1 is a side elevational view of the seamless, reinforced thin film parachute according to this invention.

This invention relates to an improved parachute generally identified as 2 in FIG. 1. Parachute 2 comprises a reinforced parachute made of a thin film polymer in thicknesses ranging from a quarter mil to several mils. One suitable thin film polymer is known as CAPRAN and is manufactured and sold by Allied Signal. The polymeric thin film is reinforced with radial and laterally extending fibers to provide sufficient strength. As shown in FIG. 1, parachute 2 has a vertical axis of symmetry identified as 4.

While this invention will be illustrated in the context of a parachute 2, it is not limited to parachutes. This invention could be used on any large, thin film structure made of multiple panels in which strength must be carried from one panel to the next. For example, this invention could also be used in balloons made of polymeric thin film materials. This invention is most useful with structures having at least one axis of symmetry such as the axis 4 shown in FIG. 1, but is not limited to such structures.

Figure 2:
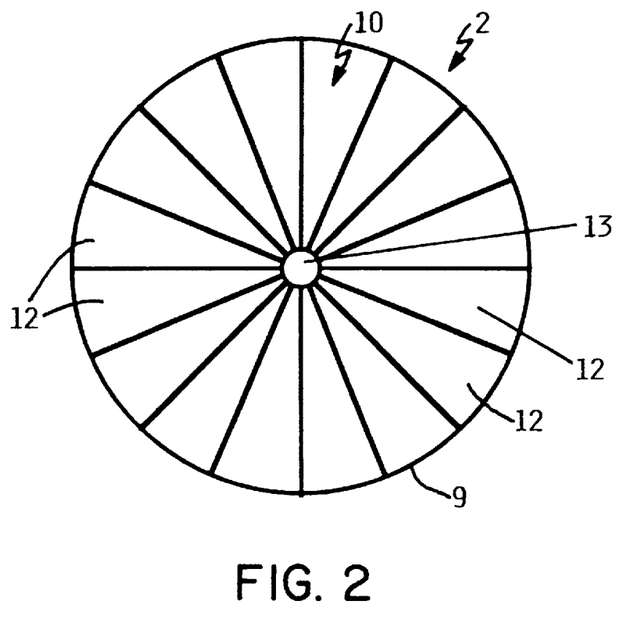
FIG. 2 is a top plan view of the parachute canopy which illustrates the assembly of sections of the thin film polymeric material forming the gores.

Parachute 2 consists of a canopy 10 and various suspension lines 11. Referring now to FIG. 2, canopy 10 consists of a series of trapezoidal shaped panels or gores 12 cut from raw, unreinforced, polymeric thin film. Gores 12 are adhesively bonded together along their long edges to form the specific required shape of canopy 10. A vent 13 is located at the center of canopy 10 to allow a small amount of air to escape and provide stability during descent.

Parachute 2 is reinforced in the radial direction with a series of radially extending fibers 14 bonded to the thin film material of gores 12. Radial fibers 14 extend from vent 13 to the skirt 9, i.e. the lower peripheral edge, of canopy 10. A plurality of radial fibers 14 are placed on the top surface of and run along the length of each gore 12 with fibers 14 being spaced apart from one another. While fibers 14 provide strength to parachute 2 in the radial direction, they provide little, if any, strength in the lateral direction across a gore 12 or from one gore to the next gore.

To provide sufficient lateral strength, parachute 2 is reinforced in the lateral direction with a plurality of continuous fibers 15 bonded to the top surface of gores 12 in a helical pattern. This helical fiber pattern for the lateral reinforcing fibers is an important aspect of this invention.

Figure 4:
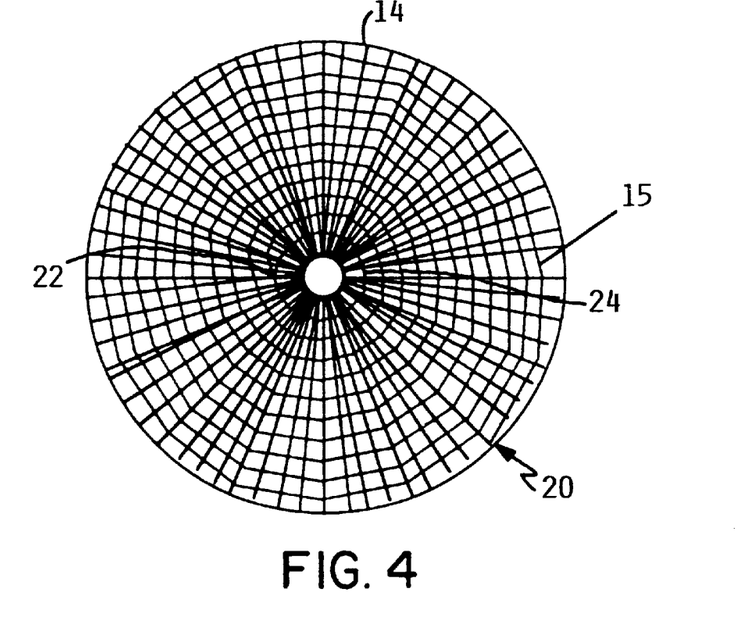
FIG. 4 is a top plan view of the parachute canopy which illustrates the reinforcement fibers in the lateral direction.

Fibers 15 extend from one end 20 adjacent skirt 9 and wind helically around the circumference of parachute 2 from one gore 12 to the next adjacent gore 12 and so on. The helically wound fibers 15 have another end 22 that is relatively close to the apex of parachute 2, i.e. end 22 is close to vent 13. As shown in FIG. 4, the upper erd 22 of fibers 15 can lead into a circular ring 24 of reinforcing fibers immediately below vent 13 such that the helical pattern of fibers 15 changes into a circular pattern for one revolution. Alternatively, as shown in FIG. 5, the helical pattern of fibers 15 could be retained over the entire length of parachute 2 with the upper end 22 of fibers 15 simply terminating at vent 13.

Figure 5:
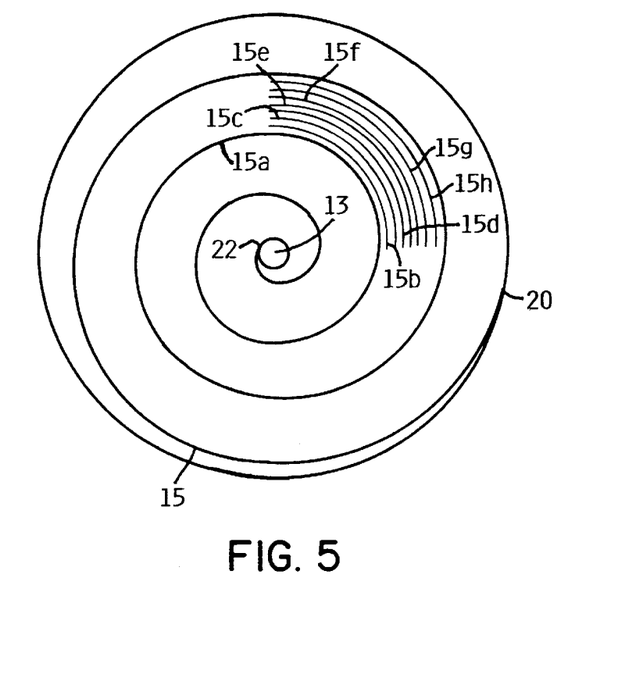
FIG. 5 is another top plan view of the parachute canopy which illustrates the reinforcement fibers in the lateral direction with only a 90° section of the fibers being shown for the sake of clarity.

Referring to FIG. 5, a plurality of fibers; 15 are in an array in which the individual fibers 15 are spaced apart from one another by ⅛ inch to 1 inch or so. This array of fibers 15 is wound around canopy 10 simultaneously. In FIG. 5, an array of eight fibers 15, indicated as 15a–15h, is shown. The number of such fibers 15 in this array of helically wound fibers could be varied only one fiber 15 is strictly necessary in the array and there could be up to a couple dozen fibers 15 in such an array.

In any event, regardless of the numbers of fibers 15 in the array, the end result is a parachute 2 with lateral reinforcing fibers that extend around the circumference of the canopy and continuously bridge from one gore 12 to the next gore 12. These fibers thus help transfer strength across the adhesively bonded seams between The side edges of the gores 12 such that the strength of such seams becomes inconsequential to the functioning of parachute 2. Thus, parachute 2 is "seamless" in that the strength of parachute 2 is that of a parachute without seams since the continuous lateral reinforcing fibers 15 extending between gores 12 provide the necessary strength.

The relative spacing and geometric layout of the fibers can be adjusted to meet the localized strength requirements for each particular section of parachute 2. This reduces weight by efficiently allocating strength where it is needed. As an example, the area near a parachute canopy's apex, i.e. near vent 13, is commonly the most highly stressed section during its inflation and will therefore require a more tightly spaced fiber pattern than the area near skirt 9. By contrast, woven fabrics have a homogeneous structure, a characteristic which distributes strength rather uniformly. This uniform strength distribution of a woven fabric is inconsistent with actual load patterns and does not maximize efficiency.

Radial and lateral reinforcing fibers 14 and 15 can comprise any known reinforcing fiber, such as fibers made of KEVLAR, VECTRAN, etc. Fibers 14 and 15 are applied to gores 12 in any known manner, preferably by adhesively bonding them to gores 12.

Figure 6:
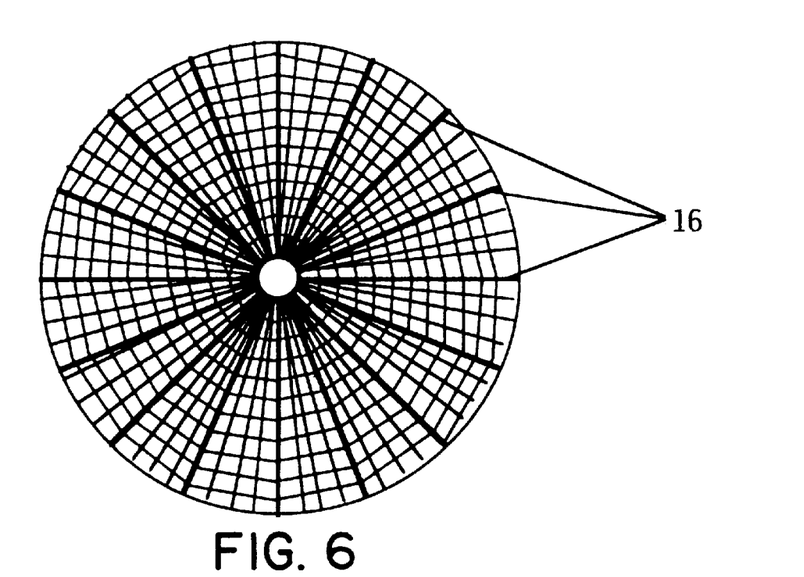
FIG. 6 is a top plan view of the parachute canopy which illustrates the radial band attachment.
Figure 7:
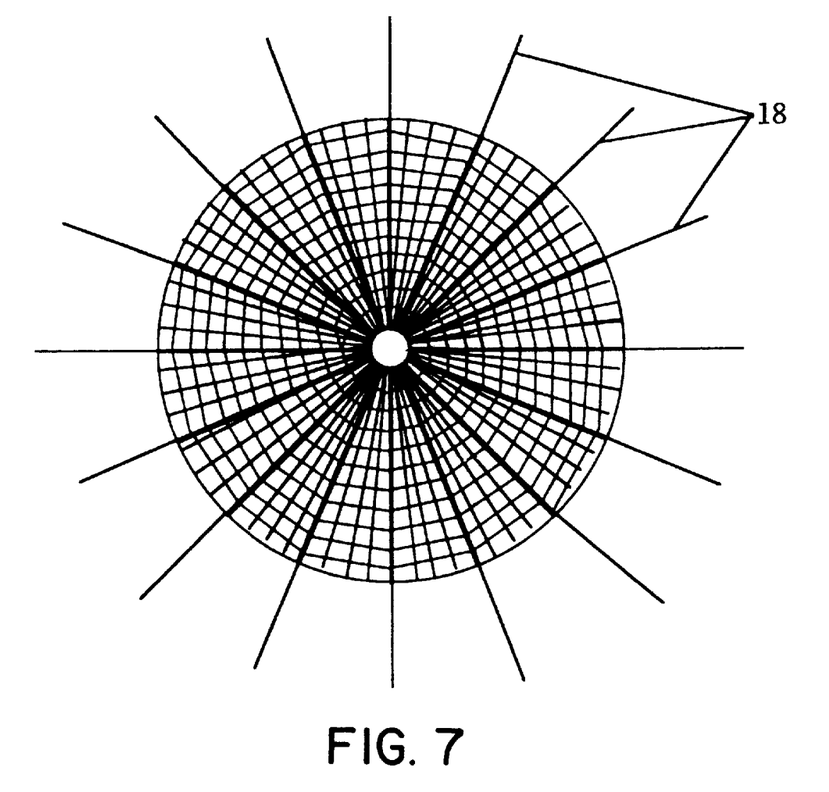
FIG. 7 is a top plan view of the parachute which illustrates the suspension line attachment.
Figure 8:
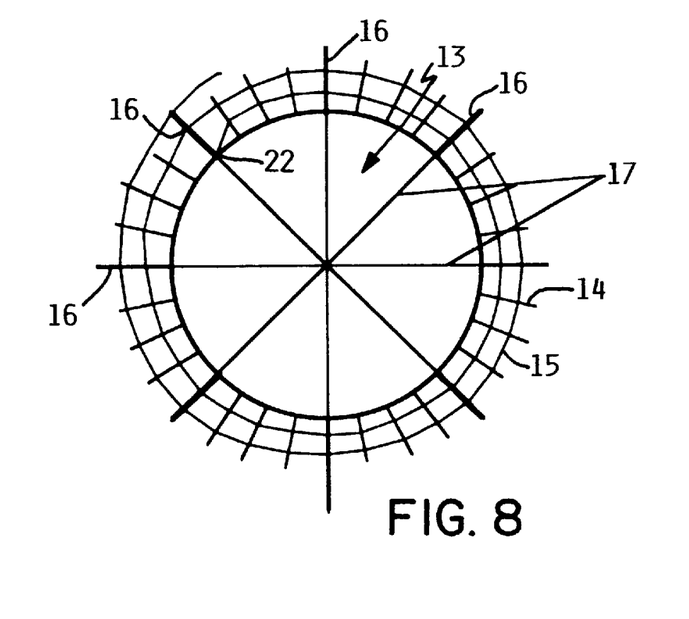
FIG. 8 is a top plan view of the canopy vent area of the parachute which illustrates the vent lines attachment over the canopy vent.

Following application of fibers 14 and 15 to canopy 10, parachute 2 is finished in a known manner as shown in FIGS. 6–8. Radial bands 16 are bonded to canopy 10 on top of the fiber reinforcements and are routed from skirt 9 to vent 13. Vent lines 17 are attached to the radial bands at vent 13 of canopy 10. The vent lines are routed across the vent opening to the radial band directly opposite of the original attachment point. Suspension lines 18 are attached to the radial bands at skirt 9 of canopy 10. The suspension lines converge to attach to the riser 19, which will ultimately be attached to the payload.

The size and shape of canopy 10, number of gores and suspension lines, number of risers, positioning of the structural reinforcements, and choice of materials are all adjusted to meet the parachute's specific requirements for opening characteristics, strength, stability and rate of descent.

By adjusting the shape of the gores and eliminating the open vent 13 at the apex of parachute 2, the invention also has applications to axially symmetrical balloon envelopes.

Figure 3:
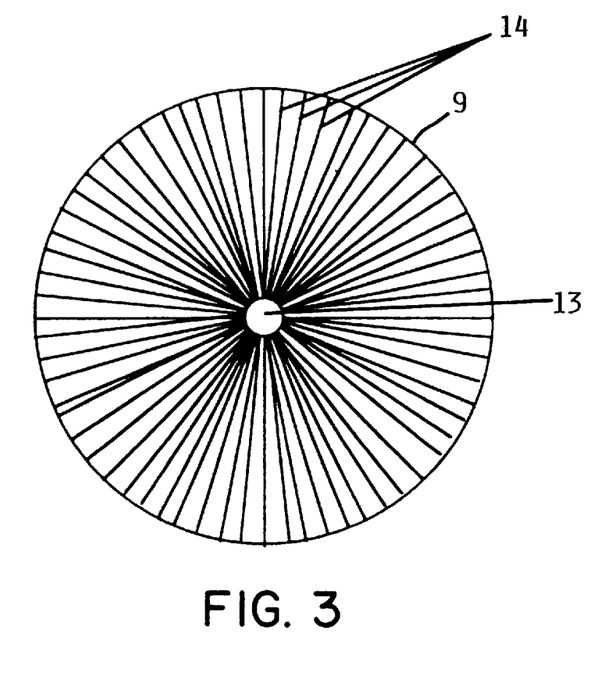
FIG. 3 is a top plan view of the parachute canopy which illustrates the reinforcement fibers in the radial direction.
Figure 9:
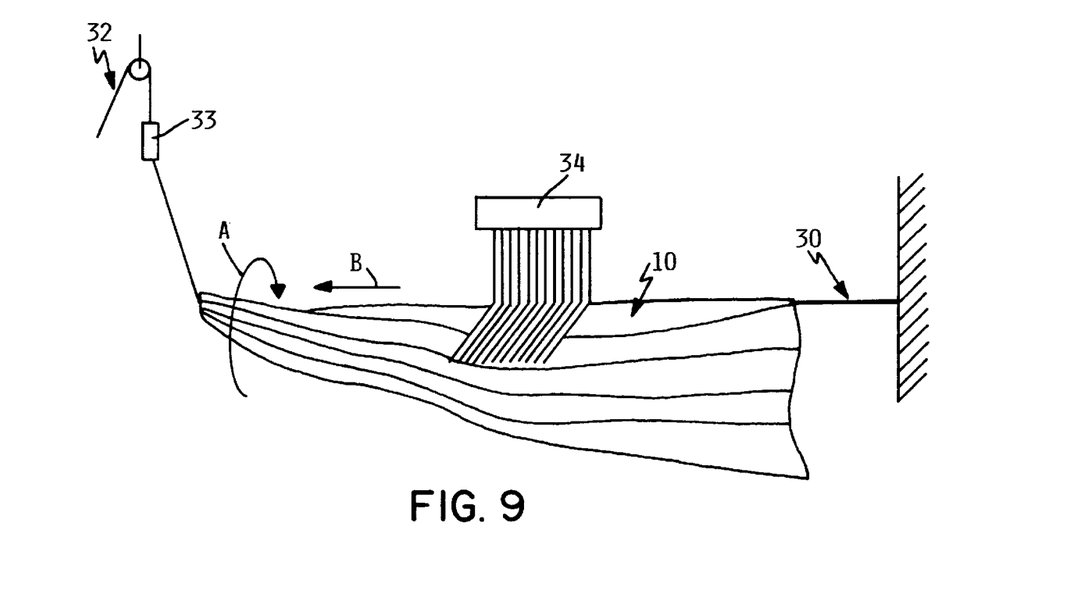
FIG. 9 is a schematic view of a manufacturing method for manufacturing the parachute of FIG. 1.

FIG. 9 illustrates a method of manufacturing parachute 2 according to this invention. In this case, canopy 10 is assembled and provided with radial fibers 14 much as is shown in FIG. 3. Canopy 10 can then be placed on a cantilevered work table 30 which extends into the interior of canopy 10. A support structure 32 having a swivel 33 is connected to the apex of canopy 10. This support structure allows canopy 10 to be rotated about its axis of symmetry such that different sides of canopy 10 can be brought up onto the top of work table 30 as indicated by arrow A. Support structure 32 also allows canopy 10 to be moved longitudinally on work table 30 as indicated by arrow B.

A fiber applicator head 34 is provided above work table 30 for laying down the array of lateral reinforcing fibers 15. Such fibers 15 can be laid down in the helical pattern of this invention if canopy 10 is rotated about its axis as indicated by arrow A and is moved longitudinally as indicated by arrow B during the fiber deposition process. Typically, fibers 15 will be laid down beginning at vent 13 and working their way down to skirt 9 though this could be reversed.

Reinforcing fibers 14 and 15 could comprise a monofilament type fiber, but preferably comprise a strand or yarn made from a plurality of fiber filaments, such yarns made of KEVLAR or other suitable reinforcing materials being well known. Thus, the term "fiber" as used herein is meant to include strands or yarns that might be made of a plurality of smaller fiber filaments. For example, the Applicant has used for each fiber 15 a yarn of Kevlar reinforcing fibers having a size of 400 denier, though other size yarns could also obviously be used.

Various modifications of this invention will be apparent to those skilled in the art. Thus, each section or gore 12 could be made from a plurality of shorter subsections that are bonded together from top to bottom to form one complete gore 12. Alternatively, the parachute could be made from a plurality of progressively smaller, complete rings that are bonded together at their top and bottom edges, i.e. the top edge of one ring would be bonded, either continuously or only at spaced locations, to the bottom edge of the ring above it. In these situations, the helical pattern of fibers 15 would still apply with the fibers 15 being applied to the individual sections before they are assembled together. Accordingly, the invention is to be limited only by the appended claims.

I claim:

1. An improved flexible structural membrane extending between an apex and a skirt, which comprises:
   a plurality of adjacent sections forming the membrane, each two adjacent sections being secured to one another along a longitudinal seam substantially extending from the skirt to the apex; and
   a continuous helical pattern of at least one reinforcing fiber secured to the sections forming the membrane, wherein the helical fiber pattern passes laterally in a plurality of revolutions across the longitudinal seams between adjacent sections to provide lateral strength to the membrane.

2. The membrane of claim 1, wherein the helical fiber pattern extends from adjacent the apex of the structure to adjacent the skirt.

3. The membrane of claim 2, wherein the spacing between adjacent revolutions of the helical fiber pattern varies.

4. The membrane of claim 3, wherein adjacent revolutions of the helical fiber pattern are spaced closer together adjacent the apex than adjacent the skirt.

5. The membrane of claim 1, wherein the helical fiber pattern is provided by a single strand of reinforcing fibers that is helically wound such that the single strand of reinforcing fibers forms all the fiber revolutions applied to the membrane.

6. The membrane of claim 1, wherein the helical fiber pattern is provided by multiple strands of reinforcing fibers that are spaced apart from one another in a fiber array, wherein the fiber array is helically wound such that each fiber strand itself provides only a portion of the fiber revolutions applied to the membrane.

7. The membrane of claim 1, wherein the spacing between adjacent fiber revolutions is ⅛ inch to 1 inch.

8. The membrane of claim 1, wherein the sections forming the membrane are formed of a flexible polymeric material.

9. The membrane of claim 8, wherein the polymeric material is a thin film material having a thickness ranging from a quarter mil to several mils.

10. The membrane of claim 1, wherein the adjacent sections are shaped to form a parachute when secured together with an open vent being provided at the apex.

11. The membrane of claim 1, wherein each section is a unitary, one-piece section of material extending between the skirt and the apex.

12. The membrane of claim 1, wherein the longitudinal seams between adjacent sections are adhesively bonded together.

13. The membrane of claim 12, further including radially extending reinforcing fibers running along the longitudinal seams between adjacent sections.

14. The membrane of claim 1, wherein the helical fiber pattern is adhesively bonded to adjacent sections.

15. An improved flexible structural membrane having an axis of symmetry, which comprises:
- a membrane extending between a first and a second end, the membrane being made of a flexible, polymeric material; and
- at least one reinforcing fiber secured to the membrane, the at least one reinforcing fiber being helically wound relative to the axis of symmetry.

16. The membrane of claim 15, wherein the at least one reinforcing fiber passes in at least one revolution around the membrane.

17. The membrane of claim 16, wherein the at least one reinforcing fiber passes in a plurality of revolutions around the membrane.

18. The membrane of claim 17, wherein the at least one reinforcing fiber extends between the first end and the second end of the membrane.

19. The membrane of claim 18, wherein the membrane is shaped to form a parachute.

20. A thin film parachute with continuous lateral reinforcing fibers, which comprises:
- a series of trapezoidal shaped gores cut from raw, unreinforced, polymeric thin film material, the gore, being adhesively bonded together along longitudinal edges extending from a first end of the gore to a second end of the gore, wherein the first end of the gore is wider than the second end of the gore such that the first ends of the gores when joined together form a skirt portion of the parachute and the second end of the gores form an apex portion of the parachute, and
- at least one continuous reinforcing fiber bonded to one surface of the gores in a helical pattern that passes over the longitudinal edges of the gores with the helical fiber pattern extending from adjacent the skirt to adjacent the apex.

* * * * *

UNITED STATES PATENT AND TRADEMARK OFFICE
CERTIFICATE OF CORRECTION

PATENT NO. : 6,056,241
DATED : May 2, 2000
INVENTOR(S) : Anthony D. Kasher It is certified that error appears in the above-identified patent and that said Letters Patent is hereby corrected as shown below:

<u>Column 1,</u>
Line 4, insert:
-- This invention was made with Government support under Contract NAS1-20590 awarded by NASA. The Government has certain rights in this invention. --.

Signed and Sealed this

Twentieth Day of September, 2005

JON W. DUDAS
*Director of the United States Patent and Trademark Office*